United States Patent [19]

Imai et al.

[11] Patent Number: 4,807,682
[45] Date of Patent: Feb. 28, 1989

[54] HEAVY DUTY PNEUMATIC TIRE

[75] Inventors: Isamu Imai, Tokorozawa; Norio Inada, Kodaira, both of Japan

[73] Assignee: Bridgestone Corporation, Tokyo, Japan

[21] Appl. No.: 931,824

[22] Filed: Nov. 18, 1986

[30] Foreign Application Priority Data

Nov. 18, 1985 [JP] Japan ................... 60-256800

[51] Int. Cl.$^4$ .............................................. B60C 9/08
[52] U.S. Cl. .................................... 152/557; 152/560
[58] Field of Search ............... 152/451, 548, 556, 560, 152/557; 57/902, 237

[56] References Cited

U.S. PATENT DOCUMENTS

| | | | |
|---|---|---|---|
| 3,977,172 | 8/1976 | Kerawalla | 57/237 |
| 4,075,172 | 2/1978 | Ozawa et al. | 528/337 X |
| 4,155,394 | 5/1979 | Shepherd et al. | 57/902 X |
| 4,177,852 | 12/1979 | Merli et al. | 152/557 X |
| 4,209,050 | 6/1980 | Yoshida et al. | 152/556 X |
| 4,389,839 | 6/1983 | van der Werff | 152/556 X |
| 4,445,560 | 5/1984 | Musy | 152/531 X |
| 4,657,058 | 4/1987 | Kabe et al. | 152/556 |

FOREIGN PATENT DOCUMENTS

| | | |
|---|---|---|
| 2063784 | 6/1971 | France. |
| 2448444 | 9/1980 | France. |
| 60-151314 | 9/1985 | Japan. |

OTHER PUBLICATIONS

Patent Abstracts of Japan, vol. 9, No. 317, (C-319) [2040], Dec. 12, 1985 (JP-A-60 151 314 Aug. 9, 1985).
Kautschuk Und Gummi Kunstsoffe, vol. 3, No. Oct. 10, 1983, pp. 870-874, Heidelberg, Germany; Pulvermacher et al.

*Primary Examiner*—Michael W. Ball
*Assistant Examiner*—Ramon R. Hoch
*Attorney, Agent, or Firm*—Sughrue, Mion, Zinn, Macpeak & Seas

[57] ABSTRACT

A heavy duty pneumatic radial tire for use under a high speed and a high internal pressure, is disclosed, which comprises a plurality of carcass cord layers of which cords are arranged at an angle from 90° to 75° with respect to a circumferential direction of the tire. The cords are composed of fibers of an aromatic polyamide having not less than 80 mole % of a repeating unit expressed by the following formula: $-NH-Ar_1-NH-CO-Ar_2-CO-$ in which $Ar_1$ and $Ar_2$ denote at least one kind of an aromatic residue selected from:

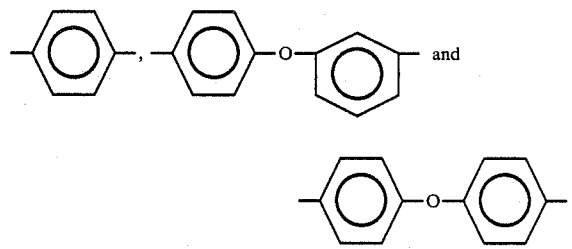

Elongation $E_n$ (%) of the aromatic polyamide fibers constituting the respective plies meets the following inequation:

$$E_{n-1}+0.2 \leq E_n \leq E_{n-1}+2.0$$

in which $E_n$ is an elongation (%) of the n-th layer of the carcass cord layers, provided that the carcass cord layers are taken as 1st ply, 2nd ply, 3rd ply, ..., n-th ply from the inner liner side in which n is an integer of 2 or more, and $E_1$ may take any arbitrary value.

1 Claim, 2 Drawing Sheets

FIG_1
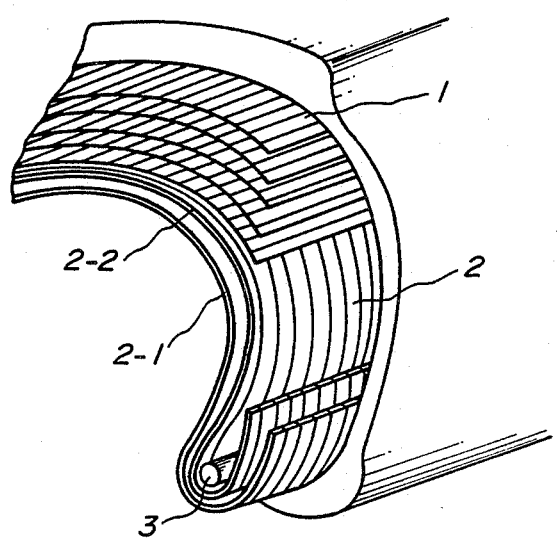

FIG_2
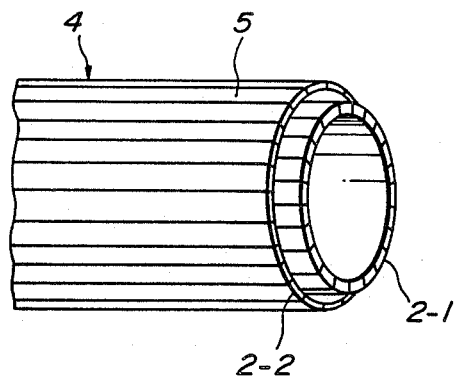
FIG_3
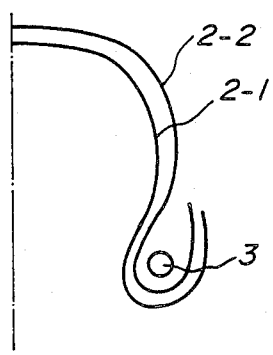

HEAVY DUTY PNEUMATIC TIRE

BACKGROUND OF THE INVENTION

(1) Field of the Invention

The present invention relates to a heavy duty pneumatic radial tire. More particularly, the invention relates to an improvement of durability of the heavy duty pneumatic tires for use under a high speed and a high internal pressure, for instance, aircraft radial tires and super high speed train radial tires.

(2) Related Art Statement

With the high performance of automobiles and the consolidation of the roads, the radial structure of the tires has been recently been progressively adopted and the percentage of the radial structure has been increasing. However, in the case of the aircraft tires and the super high speed train tires, the structural innovation of the tires are slow, and much have not examined therefor up to now, probably because of consideration upon the safety. Nevertheless, while the social demand for energy saving and the demand for the fuel mileage improvement have recently become greater, weight-reducing need in the tire parts has been also getting larger and larger. From this point of view, radial tires using aromatic polyamide fiber cords instead of steel cords as tire reinforcement have been examined. In particular, it is anticipated that a large scale of weight reduction can be accomplished by using aromatic polyamide fibers as high tenacity and high modulus cords in the carcass plies.

However, there is a big problem in the use of the aromatic polyamide fibers in the plural carcass ply layers. In other words, the fibers having high tenacity and high modulus possess the problems that the fibers have inactive molecular motion with respect to heat and are difficult to thermally shrink. For this reason, when a tire is produced by using such plural ply layers, the ply cords positioned in the inner layer or layers are likely to meander. This results in local unwinding of the twisting cords. Further, such a phenomenon is likely to occur particularly at a shoulder portion and a bead portion at which deformation of the tire is larger. This is because a bending operation is generally necessary in forming the plural carcass plies during the production of the tire, and difference in cord passing distance occurs in the inwardly positioned carcass cord layer or layers. On the other hand, in the case of the cords of fibers made of rayon, polyester, nylon, or the like as the material of the general use tire cords, no such meandering occurs because they thermally shrink during the vulcanization. Further, in the case of the conventionally used aromatic polyamide fibers, there is a problem that the cords are cut due to fatigue during use at portions where the cords are locally unwound. Therefore, tires merely employing the aromatic polyamide in the plural carcass layers can not be practically used.

SUMMARY OF THE INVENTION

The present inventors have made various studies to solve the above problems encountered by the use of plural carcass cord layers composed of the aromatic polyamide fibers and to reduce the weight of the heavy duty pneumatic tires to be used under high speed and high internal pressure, for instance, aircraft radial tires, and super high speed train radial tires while simultaneously improving the durability thereof. Consequently, the present inventors have found that the intended heavy duty radial tire can be obtained by using aromatic polyamide which has a specified structure and specifies the elongation at 2.2 g/d, and accordingly have come to accomplish the present invention.

According to the present invention, there is therefore a provision of a heavy duty pneumatic radial tire for use under a high speed and a high internal pressure, comprising a plurality of carcass cord layers of which cords are arranged at an angle from 90° to 75° with respect to a circumferential direction of the tire, said cords being composed of fibers of an aromatic polyamide having not less than 80 mole % of a repeating unit expressed by the following formula: $-NH-Ar_1-NHCO-Ar_2-CO-$ in which $Ar_1$ and $Ar_2$ denote at least one kind of an aromatic residue selected from:

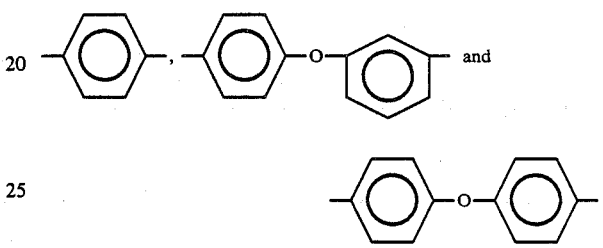

wherein elongation $E_n$ (%) of the aromatic polyamide fibers constituting the respective plies meets the following inequation:

$$E_{n-1}+0.2 \leq E_n \leq E_{n-1}+2.0$$

in which $E_n$ is an elongation (%) of the n-th layer of the carcass cord layers, provided that the carcass cord layers are taken as 1st ply, 2nd ply, 3rd ply, ..., n-th ply from the inner liner side in which n is an integer of 2 or more and $E_1$ may take any arbitrary value.

By being thus constructed, the heavy duty pneumatic radial tire according to the present invention attains the weight reduction and the durability improvement by using high tenacity and high modulus cords made of the fibers of the aromatic polyamide having not less than 80% of the repeating unit represented by the above formula, $-NH-Ar_1-NHCO-Ar_2-CO-$ in the carcass cord layers.

These and other objects, features and advantages of the present invention will be well appreciated upon reading of the following description of the invention when taken in connection with the attached drawings with understanding that some modifications, variations, and changes could be done by the skilled person in the art to which the invention pertains without departing from the spirit of the invention or the scope of claims appended hereto.

BRIEF DESCRIPTION OF THE INVENTION

For a better understanding of the invention, reference is made to the attached drawings, wherein:

FIG. 1 is a schematic view of an arrangement of a belt and a carcass of a tire in Example 1;

FIG. 2 is a perspective view of a cylindrical drum-like band in a prestage in the formation of the carcass of the tire in Example 1; and FIG. 3 is a sectional view of a right half portion of the carcass formed from the band in FIG. 2.

DETAILED DESCRIPTION OF THE INVENTION

The meandering and the local unwinding of the inside cords which are a part of the problems incident to conventional tires having plural carcass cord layers using the aromatic polyamide fibers during a tire building can be fundamentally prevented by applying a tension to the inside carcass cords layer during the tire building, for instance, during a vulcanizing step. For this purpose, the next outer side carcass cords have only to be easier to expand, that is, to have a lower modulus than the inside carcass cords. Further, when the meandering and local unwinding of the carcass cords on the inner side are prevented, tension is applied to the inside cords even under an application of an internal pressure and a load to a new tire, so that the tension is uniformized over the respective ply cord layers. However, when the outer side ply is designed easy to expand, too much tension is inversely and unfavorably applied to the inside carcass. From this, according to the present invention, as the elongation $E_n$ (%) at the time of 2.2 g/d is represented by the above-mentioned inequation: $E_{n-1}+0.2 \leq E_n \leq E_{n-1}+2.0$, the elongation of the next outer side (on the side of tire side portions) cords is set larger by not less than 0.2% and smaller by not more than 2.0% as compared with that of the inner side (inner liner side) cords.

The present invention will be explained in more detail with reference to the following Examples, Comparative Examples and Prior Art. However, these Examples are merely given for illustration of the invention, but should never be interpreted to limit the scope thereof.

Methods of producing Kevlar and HM-50 are described in detail in Japanese patent publication No. 55-14,167 and Japanese patent application laid-open No. 60-151,314, respectively. As dipping conditions, an epoxide aqueous solution (2%) and RFL were used as a first bath liquid and a second bath liquid, respectively. Thermal treatment was carried out while a temperature in a dry zone was maintained at 160° C., a temperature of a hot zone and a normalizing zone was at 250° C., and to obtain a desired $E_n$, a tension was varied in a range from 3 to 4 kg during dipping in the first bath liquid, and a tension was set at 1 kg during dipping in the second bath liquid. In order to obtain a desired $E_n$, the number of twists may be varied, or, the dipping conditions may be varied.

EXAMPLE 1

Five kinds of tires each having a tire size of H 46×18 R 20 as shown in FIG. 1 were experimentally prepared. In FIG. 1, a reference numeral 1 shows a belt layer which is composed of cords arranged in parallel with a tire circumferential direction. The cord is a continuous cord which is wound around the tire circumference. A reference numeral 2 denotes carcass cord layers. Reference numerals 2-1 and 2-2 show an inner carcass cord layer and an outer carcass cord layer, respectively. The cords are arranged substantially at right angles to the tire circumferential direction. A reference numeral 3 shows a bead wire. In this Example, the tires were experimentally prepared while the cords used in the carcass cord layers were varied as shown in Table 1.

As the aromatic polyamide used as the cords, Kevlar manufactured by du Pont and composed of polyparaphenylene terephthalamide and a copolymer HM-50 manufactured by Teijin Co., Ltd. and composed of 50% mole of polyparaphenylene terephthalamide and 50% mole of poly-3,4'-diphenyl ether terephthalamide were used. Next, in order to form the carcass cord layers, a necessary number of the cord layers were piled as shown in FIG. 2 to form a drum-like cylindrical band 4. A reference numeral 5 shows a cord. Further, bead wires were attached from the right and left, cord layers were turned therearound, and an internal pressure was applied to the inside by means of a bladder or the like, thereby forming the carcass sectionally shown in FIG. 3. In that case, difference in cord passing distance occurs between the inside carcass cord layer 2-1 and the outside cord layer 2-2. Meandering was produced in the cord layer on the inside as viewed in a radial direction. In Tire No. 1 of Table 1, Kevlar having the same physical properties was used in the first ply layer (innermost layer) and the second ply layer (outermost layer) of the carcass. In Tire Nos. 2 to 5, the $E_2$ (elongation at 2.2 g/d) of the second ply layer of the carcass was made larger by 0.3, 1.5, 2.5 and 2.4%, respectively, than the $E_1$ of the first ply layer. Tire Nos. 2 and 3 fall in the scope of the present invention, and the other are tires as Comparative Examples. With respect to the above tires, the tire performances were evaluated by the following evaluation methods, and results are also shown in Table 1.

EVALUATION METHODS (1) High speed durability:

While a speed was increased by 20 km/hr every 5 minutes under a constant internal pressure of 13.5 kg/cm² (normal internal pressure) and a constant normal load of 20 tons, test was continued until the tire produced a trouble. The speed at that time was taken as a durable level.

(2) Hydraulic pressure test:

A hydraulic pressure value until a tire was broken was determined. A carcass tenacity was shown as a total value of cord tenacities of the first and second plies (the end count was equal in all the Tires).

(3) Cord fatigue property:

A tire was continuously run at a speed of 65 km/hr under a constant normal load of 20 tons, and stopped at a total running distance of 6,000 km. Cords were sampled from the tire, and the cord fatigue property was indicated as the tenacity maintaining percentage with respect to the new cords.

TABLE 1

| Member | Dipped cord | No. 1 Comparative Example | No. 2 Example | No. 3 Example | No. 4 Comparative Example | No. 5 Comparative Example |
| --- | --- | --- | --- | --- | --- | --- |
| 1st ply of Carcass (Innermost layer) | Cord kind | KEVLAR | KEVLAR | KEVLAR | KEVLAR | HM-50 |
| | Denier | 3000/3 | 3000/3 | 3000/3 | 3000/3 | 3000/3 |
| | Number of twist | 20 × 20 | 20 × 20 | 20 × 20 | 20 × 20 | 20 × 20 |
| | Tenacity (kg) | 165 | 170 | 170 | 170 | 170 |
| | $E_1$ (%) | 1.2 | 1.2 | 1.2 | 1.2 | 1.2 |
| 2nd ply of | Cord kind | KEVLAR | KEVLAR | KEVLAR | HM-50 | HM-50 |

TABLE 1-continued

| Member | Dipped cord | No. 1 Comparative Example | 2 Example | 3 Example | No. 4 Comparative Example | 5 Comparative Example |
|---|---|---|---|---|---|---|
| Carcass (Outermost layer) | Denier | 3000/3 | 3000/3 | 3000/3 | 3000/3 | 3000/3 |
| | Number of twist | 20 × 20 | 21 × 21 | 25 × 25 | 27 × 27 | 27 × 27 |
| | Tenacity (kg) | 165 | 163 | 135 | 115 | 120 |
| | $E_2$ (%) | 1.2 | 1.5 | 2.7 | 3.7 | 3.6 |
| Tire performances | High speed durability (km/hr) | 300 | 330 | 330 | 310 | 300 |
| | Hydraulic pressure test (kg/cm$^2$) | 58 (100) 330 (100) | 65 (112) 330 (100) | 56 (96.6) 300 (91) | 42 (72) 280 (85) | 43 (74) 290 (88) |
| | Fatigue property | | | | | |
| | 1st ply (%) | 31 | 92 | 91 | 72 | 68 |
| | 2nd ply (%) | 95 | 96 | 95 | 93 | 96 |

From the results in Table 1, Tire Nos. 2 and 3 as Examples of the present invention are excellent in high speed durability and more excellent in hydraulic pressure test level as compared with the carcass tenacity ratio. This is related to the fact that since the tension is uniformly shared by the ply cords, the elongation of the carcass due to a centrifugal force becomes smaller and the durable level is increased at high speed durability test, and the positional conformity of the first ply with the second ply when being pulled is improved in the hydraulic pressure test. Further, in the conventional Tire No. 1, the fatigue property of the first ply layer is extremely inferior. As mentioned in the foregoing, this is because the meandering and local unwinding of the cords occurred.

EXAMPLE 2

Seven kinds of tires each having a tire size of H 46×18 R 20 were experimentally prepared as in the case of the tires in Example 1. As shown in Table 2, in Tire Nos. 1 to 7, three plies were employed as the carcass cord layers. In Tire No. 1, all $E_n$ values were equally set at 1.0. In Tire Nos. 2 to 7, the respective $E_n$ values were varied. With respect to these tires, the tire performances were evaluated according to the evaluation methods described in connection with Example 1. Obtained results are shown in Table 2. The tendencies in the tire performances were similar to those in Example 1.

TABLE 2

| Member | Dipped cord | No. 1 Comparative Example | 2 Example | 3 Example | 4 Comparative Example | 5 Comparative Example | 6 Comparative Example | 7 Example |
|---|---|---|---|---|---|---|---|---|
| 1st ply of carcass (Innermost layer) | Cord kind | KEVLAR | KEVLAR | KEVLAR | KEVLAR | KEVLAR | HM-50 | HM-50 |
| | Denier | 1500/3 | 1500/3 | 1500/3 | 1500/3 | 1500/3 | 1500/3 | 1500/3 |
| | Number of twist | 30 × 20 | 30 × 30 | 30 × 30 | 30 × 30 | 30 × 30 | 30 × 30 | 30 × 30 |
| | Tenacity (kg) | 70 | 70 | 70 | 70 | 70 | 70 | 70 |
| | E (%) | 1.0 | 1.0 | 1.0 | 1.0 | 1.0 | 1.0 | 1.0 |
| 2nd ply of carcas (Intermediate layer) | Cord kind | KEVLAR | KEVLAR | KEVLAR | KEVLAR | HM-50 | HM-50 | HM-50 |
| | Denier | 1500/3 | 1500/3 | 1500/3 | 1500/3 | 1500/3 | 1500/3 | 1500/3 |
| | Number of twist | 30 × 20 | 31 × 31 | 31 × 31 | 30 × 30 | 31 × 31 | 30 × 30 | 31 × 31 |
| | Tenacity (kg) | 70 | 68 | 68 | 70 | 68 | 70 | 68 |
| | E (%) | 1.0 | 1.3 | 1.3 | 1.1 | 1.3 | 1.1 | 1.3 |
| 3rd ply of carcass (Outermost layer) | Cord kind | KEVLAR | KEVLAR | KEVLAR | KEVLAR | KEVLAR | HM-50 | HM-50 |
| | Denier | 1500/3 | 1500/3 | 1500/3 | 1500/3 | 1500/3 | 1500/3 | 1500/3 |
| | Number of twist | 30 × 30 | 33 × 33 | 36 × 36 | 36 × 36 | 36 × 36 | 30 × 30 | 32 × 32 |
| | Tenacity (kg) | 70 | 63 | 54 | 54 | 53 | 70 | 65 |
| | E (%) | 1.0 | 2.0 | 3.3 | 3.4 | 3.5 | 1.3 | 1.8 |
| Tire performances | High-speed durability (km/hr) | 300 | 320 | 320 | 300 | 300 | 310 | 320 |
| | Hydraulic pressure test (Index) (kg) | 57 (100) | 56 (98) | 53 (93) | 47 (82) | 46 (81) | 52 (91) | 57 (100) |
| | Carcass tenacity (Index) (kg) | 210 (100) | 203 (97) | 194 (92) | 194 (92) | 193 (92) | 210 (100) | 205 (98) |
| | Fatigue property | | | | | | | |
| | 1st ply (%) | 20 | 80 | 82 | 81 | 80 | 60 | 80 |
| | 2nd ply (%) | 79 | 85 | 88 | 85 | 86 | 85 | 90 |
| | 3rd ply (%) | 90 | 96 | 98 | 97 | 97 | 89 | 98 |

As explained in the above, according to the tire of the present invention, the cords of the carcass cord layers are made of the fibers composed of the aromatic polyamide having a specific structure and satisfying the relation regarding the elongation. Thereby, the weight of the tire is reduced and the durability is simultaneously improved. In particular, the present invention is useful for the heavy duty pneumatic tires used under high speed and high internal pressure, for instance, aircraft tires, and super high speed train tires such as linear motor tires.

What is claimed is:

1. A heavy duty pneumatic radial tire for use at high speeds and under high internal pressures, comprising a plurality of carcass cord layers, wherein cords reinforcing the plurality of carcass cord layers are arranged at an angle from 90° to 75° with respect to a circumferential direction of the tire, and wherein said cords are composed of fibers of an aromatic polyamide having not less than 80 mole % of a repeating unit expressed by the following formula:

$$-NH-Ar_1-NHCO-Ar_2-CO-$$

wherein $Ar_1$ and $Ar_2$ are at least one aromatic residue selected from the group consisting of:

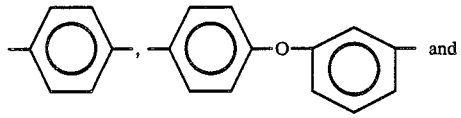

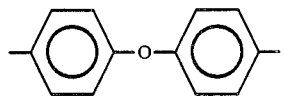

wherein the elongation $E_n$ (%) of the aromatic polyamide fibers constituting the respective plies meets the following requirements:

$$E_{n-1}+0.2 \leq E_n \leq E_{n-1}+2.0$$

wherein $E_n$ is an elongation (%) at 2.2 g/d of the n-th layer of the carcass cord layers, provided that the carcass cord layers are taken as the 1st ply, 2nd ply, 3rd ply, ..., n-th ply radially located successively farther from the innermost side of the tire, wherein n is an integer of 2 or more and $E_1$ is an arbitrary value.

* * * * *